(12) United States Patent
Matsuno

(10) Patent No.: US 9,223,311 B2
(45) Date of Patent: Dec. 29, 2015

(54) VEHICLE DRIVING SUPPORT CONTROL APPARATUS

(71) Applicant: FUJI JUKOGYO KABUSHIKI KAISHA, Tokyo (JP)

(72) Inventor: Koji Matsuno, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 14/091,197

(22) Filed: Nov. 26, 2013

(65) Prior Publication Data

US 2014/0156158 A1 Jun. 5, 2014

(30) Foreign Application Priority Data

Dec. 3, 2012 (JP) ................................. 2012-264521

(51) Int. Cl.
*G05D 1/02* (2006.01)
*G08G 1/16* (2006.01)
*G01S 13/86* (2006.01)
*G01S 13/93* (2006.01)

(52) U.S. Cl.
CPC .............. *G05D 1/0231* (2013.01); *G05D 1/021* (2013.01); *G08G 1/167* (2013.01); *G01S 13/867* (2013.01); *G01S 13/931* (2013.01); *G05D 1/0238* (2013.01); *G05D 1/0242* (2013.01); *G05D 1/0246* (2013.01); *G05D 1/0257* (2013.01)

(58) Field of Classification Search
CPC ... G05D 1/021; G05D 1/0231; G05D 1/0238; G05D 1/0242; G05D 1/0246; G05D 1/0251; G05D 1/0257; G01S 3/867; G01S 13/931; G01S 2013/9346

USPC ........................................... 701/23, 26, 28, 70
See application file for complete search history.

(56) References Cited

U.S. PATENT DOCUMENTS

| | | | | |
|---|---|---|---|---|
| 5,410,304 A | * | 4/1995 | Hahn et al. | 340/903 |
| 5,652,588 A | * | 7/1997 | Miron | 342/58 |
| 7,212,901 B2 | * | 5/2007 | Sadano et al. | 701/301 |
| 7,236,884 B2 | * | 6/2007 | Matsumoto et al. | 701/301 |
| 7,680,569 B2 | * | 3/2010 | Matsumoto et al. | 701/28 |
| 8,090,537 B2 | * | 1/2012 | Nishira et al. | 701/301 |
| 8,145,385 B2 | * | 3/2012 | Hayakawa et al. | 701/42 |
| 8,258,935 B2 | * | 9/2012 | Hashimoto et al. | 340/435 |
| 2005/0270537 A1 | * | 12/2005 | Mian et al. | 356/437 |

(Continued)

FOREIGN PATENT DOCUMENTS

JP 2003-217099 A 7/2003

*Primary Examiner* — Helal A Algahaim
*Assistant Examiner* — Dale W Hilgendorf
(74) *Attorney, Agent, or Firm* — McDermott Will & Emery LLP

(57) ABSTRACT

A vehicle driving support control apparatus receives lane line information given from a first environment recognizer and information on a target three-dimensional object given from a second environment recognizer. The apparatus estimates the visual range of a driver based on the lane line information, and estimates the driving lane based on at least either one of the lane line information and the target three-dimensional object information, and estimates the driving track of the vehicle. Based on the estimated driving lane and driving track, the apparatus estimates a deviation position where the subject vehicle will deviate from the driving lane on the basis of the driving lane and the driving track estimated. If the deviation position is beyond the visual range, the apparatus executes at least either one of notification to the driver and automatic braking in accordance with the possibility of deviation from the driving lane.

12 Claims, 4 Drawing Sheets

(56) References Cited

U.S. PATENT DOCUMENTS

| | | | |
|---|---|---|---|
| 2007/0288133 A1* | 12/2007 | Nishira et al. | 701/301 |
| 2009/0292468 A1* | 11/2009 | Wu et al. | 701/301 |
| 2010/0023218 A1* | 1/2010 | Hayakawa et al. | 701/42 |
| 2010/0030430 A1* | 2/2010 | Hayakawa et al. | 701/42 |
| 2010/0052550 A1* | 3/2010 | Kobayashi | 315/158 |
| 2010/0082195 A1* | 4/2010 | Lee et al. | 701/25 |
| 2011/0010094 A1* | 1/2011 | Simon | 701/301 |
| 2011/0190972 A1* | 8/2011 | Timmons et al. | 701/29 |

* cited by examiner

VEHICLE DRIVING SUPPORT CONTROL APPARATUS

CROSS-REFERENCE TO RELATED APPLICATIONS

The present application claims priority from Japanese Patent Application No. 2012-264521 filed on Dec. 3, 2012, the entire contents of which are hereby incorporated by reference.

BACKGROUND

1. Technical Field

The present invention relates to vehicle driving support control apparatuses for executing warning and automatic braking in order to prevent a vehicle from deviating from a driving lane in front thereof.

2. Description of the Related Art

In recent years, for a vehicle, various kinds of driving support control apparatuses for a vehicle have been developed and put into practice to detect a driving lane in front of the vehicle, a three-dimensional object such as a vehicle and an obstacle in front of the vehicle using a camera, a radar, and the like, and prevent the vehicle from deviating from the driving lane and prevent a collision with the three-dimensional object. In such driving support control apparatus, highly accurate detection of driving environment in front of the vehicle directly results in accurately performing driving support control. Therefore, for example, a vehicle surrounding monitoring apparatus disclosed in Japanese Unexamined Patent Application Publication (JP-A) No. 2003-217099 calculates the position of an object on the basis of information on a captured image, and calculates the position of the object on the basis of a reflected wave of an emitted radio wave. Then the apparatus calculates an observation position obtained as a result of observation based on both of the positions thus calculated and determines a possibility that the object in front of the subject vehicle comes close to the vehicle at a predetermined distance or less. When the possibility is determined to be high, the possibility is notified to the driver.

However, such vehicle driving support control apparatus for preventing collision has a big problem in the driving support technique, which is the difficulty of making determination as to execution, i.e., how to extract, present, and control necessary information when it is needed by the driver. More specifically, even if a three-dimensional object such as an obstacle in front of the vehicle is detected with a high degree of accuracy like the vehicle surrounding monitoring apparatus disclosed in JP-A No. 2003-217099 described above, there is a drawback as follows: when a danger that the driver is already well aware of is warned or controlled more than necessary, the driver becomes accustomed to such warning and control, and this may cause delay of reaction when the danger is really eminent, or the driver may be annoyed by the warning or the control, and turn off the driving support function. As a result the driving support control apparatus may be unable to accomplish its function.

SUMMARY OF THE INVENTION

The present invention has been made in view of the above circumstances and an object thereof is to provide a vehicle driving support control apparatus capable of appropriately preventing the vehicle from colliding with an obstacle by a side of a road and from deviating from a driving lane by giving notification to a driver, activating brake, and the like, with regard to a driving lane in front of the vehicle which is considered not to be recognized by the driver.

An aspect of the present invention provides a vehicle driving support control apparatus including: a first environment recognizer to detect lane line information on a of a driving lane in front, on the basis of image information; a second environment recognizer to detect information on a three-dimensional object by a side of a road of the driving lane in front, on the basis of radio wave information transmitted and received; a visual range estimator to estimate the visual range of a driver on the basis of the lane line information; a driving lane estimator to estimate the driving lane on the basis of at least either one of the lane line information and the three-dimensional object information; a driving track estimator to estimate the driving track of the vehicle; a deviation position estimator to estimate a deviation position where the vehicle will deviate from the driving lane, on the basis of the driving lane estimated by the driving lane estimator and the driving track estimated by the driving track estimator; and a lane deviation prevention controller to execute at least either one of notification to the driver and automatic braking in accordance with a possibility of deviation from the driving lane when the deviation position is beyond the visual range.

DETAILED DESCRIPTION

Hereinafter, an example of the present invention will be described with reference to the drawings.

Figure 1:
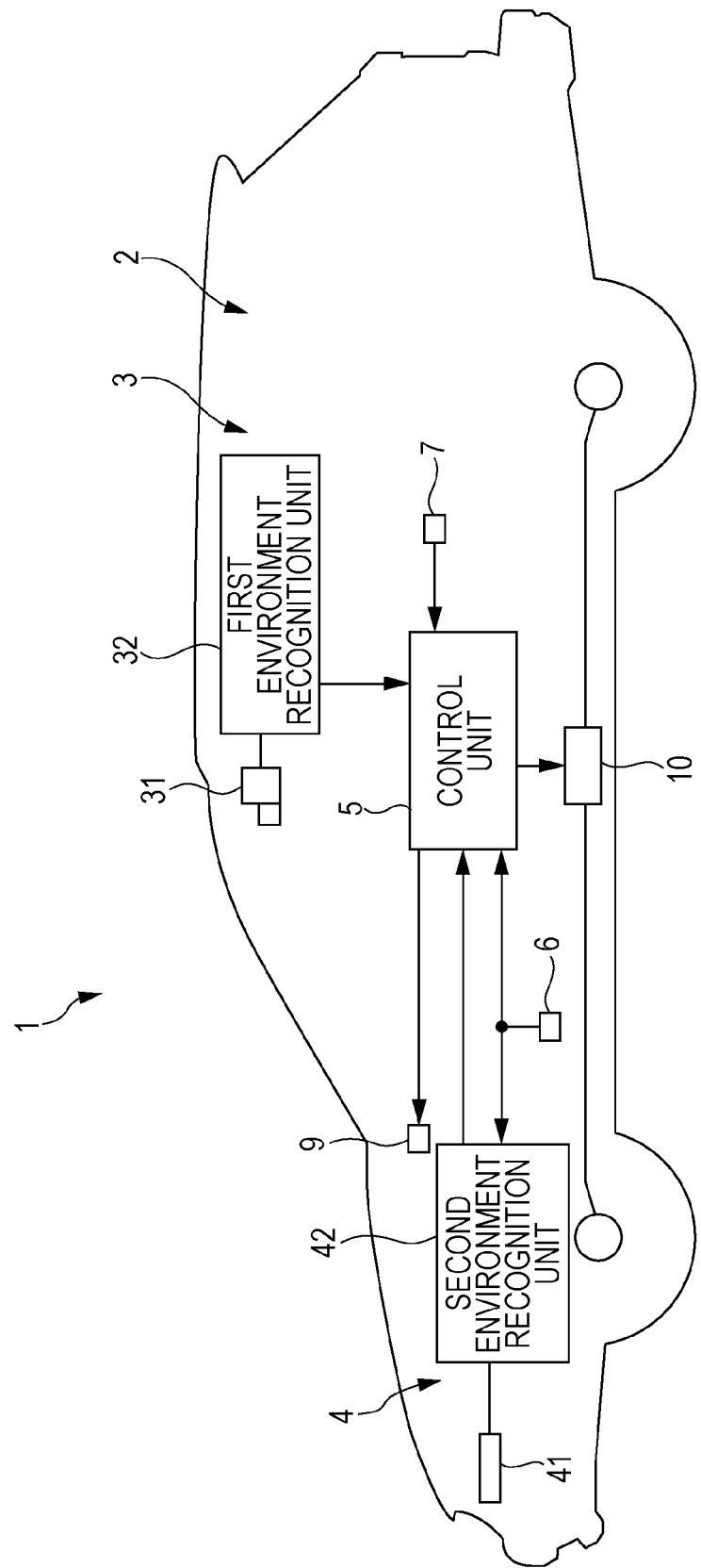
FIG. 1 is a schematic configuration diagram illustrating a vehicle driving support control apparatus mounted on a vehicle according to an example of the present invention.

In FIG. 1, a vehicle (subject vehicle) 1 such as an automobile has a driving support control apparatus 2. The driving support control apparatus 2 mainly includes a stereo camera unit 3 serving as the first environment recognizer of the present invention and a millimeter wave radar unit 4 serving as the second environment recognizer of the present invention, and a control unit 5. The driving support control apparatus 2 is connected to various kinds of sensors such as a vehicle speed sensor 6 for detecting a vehicle speed V0 of the vehicle 1, and a steering angle sensor 7 for detecting a steering angle $\theta H$. The control unit 5 outputs a control signal to a warning lamp 9 and a brake driving unit 10 as necessary.

The stereo camera unit 3 includes a stereo camera 31 and a first environment recognition unit 32 for processing signals from the stereo camera 31.

The stereo camera 31 includes, as a stereo optical system, a pair of left and right CCD cameras having solid state imaging devices such as charge-coupled devices (CCD), for example. The CCD cameras constituting the stereo camera 31 are attached on front portions of a ceiling of a compartment of the vehicle 1 with a predetermined distance therebetween, capture images of an external object in stereo from different viewpoints, and output the captured image information to the first environment recognition unit 32.

The first environment recognition unit 32 receives image the information from the stereo camera 31, and estimates the lane by recognizing lane line data in front of the vehicle and the like. The first environment recognition unit 32 processes the image information from the stereo camera 31 as follows, for example: the first environment recognition unit 32 generates distance information for a pair of right and left images (stereo images), which is obtained by capturing the environment ahead of the vehicle 1 in the traveling direction with the stereo camera 31, using a difference between corresponding positions in according to a principle of triangulation. The first environment recognition unit 32 first divides the reference image (for example, right image) into small regions, compares the luminance or the color pattern of each small region with that of the comparison image to find a region in the comparison image corresponding thereto and obtain a distance distribution over the entire reference image. The first environment recognition unit 32 also checks the luminance difference between adjacent pixels for each pixel on the reference image, extracts pixels having luminance differences larger than a threshold (contrast threshold) as edges, and adds distance information to the extracted pixels (edges) to generate a distribution image (distance image) of the edges having the distance information. Then, for example, the first environment recognition unit 32 performs well-known grouping processing on the distance image, and performs pattern matching with various kinds of predetermined templates, thus recognizing the lane line in front of the vehicle. This recognition of the lane line is continuously monitored over frames. When recognizing the lane line, the first environment recognition unit 32 also stores, as lane line data, the width W of the lane line from the position coordinates of the right and left lane lines and the width direction position of the vehicle 1 within the lane (the distance from the vehicle 1 to the left lane line and the distance from the vehicle 1 to the right lane line). For a lane line other than the above lane line obtained based on luminance and contrast of the image information given by the stereo camera 31, e.g., a lane line portion that is interrupted due to some reason and a lane line of the its own lane estimated to be existing still farther, the first environment recognition unit 32 estimates by farther extending the lane line obtained from the image information from the stereo camera 31, thus estimating it as the coordinate data. The estimated coordinate data of the lane line may be obtained using map data and the like of a navigation system, not illustrated. Then, the lane line information on the driving lane thus obtained by the stereo camera unit 3 is output to the control unit 5.

The millimeter wave radar unit 4 includes a millimeter wave transmission reception unit 41 and a second environment recognition unit 42 for processing a signal given by the millimeter wave transmission reception unit 41.

The millimeter wave transmission reception unit 41 is provided at the front end of the vehicle 1, and is configured to transmit a predetermined millimeter wave (for example, radio wave of 30 GHz to 100 GHz) toward ahead of the vehicle, and receive the millimeter wave reflected back, thus giving the transmitted and received data to the second environment recognition unit 42.

The second environment recognition unit 42 recognizes a three-dimensional object by processing the transmitted and received data given by the millimeter wave transmission reception unit 41 as follows: the second environment recognition unit 42 measures a relative distance from the vehicle 1 to a target on the basis of a time interval between the time when the transmission wave is reflected by the target and the time when the transmission wave is returned back. Then, a portion in which the same distance value appears continuously, as well as the size (the width) and the coordinate data, are extracted as a piece of three-dimensional object from the distribution state of the distance values. For each three-dimensional object thus extracted, the distance from the vehicle 1 is derived, and the three-dimensional object which is located by a road side of the driving lane in front of the vehicle is recognized and extracted by performing well-known grouping processing on the distance information and performing pattern matching with various kinds of predetermined templates. The three-dimensional object information on the three-dimensional object is output to the control unit 5.

The control unit 5 receives the lane line information on the driving lane from the first environment recognition unit 32 of the stereo camera unit 3, receives the three-dimensional object information on the three-dimensional object from the second environment recognition unit 42 of the millimeter wave radar unit 4, receives the vehicle speed V0 from the vehicle speed sensor 6, receives the steering angle θH from the steering angle sensor 7.

Then, the control unit 5 estimates the visual range of the driver based on the lane line information on the basis of the above input information, estimates the driving lane on the basis of at least either one of the lane line information and the three-dimensional object information, estimates the driving track of the vehicle 1, estimates the deviation position where the vehicle 1 will deviate from the driving lane on the basis of the estimated driving lane and the estimated driving track. If the deviation position is beyond the visual range of the driver, the control unit 5 executes at least either one of notification to the driver or automatic braking in accordance with the possibility of deviation from the driving lane.

Figure 2:
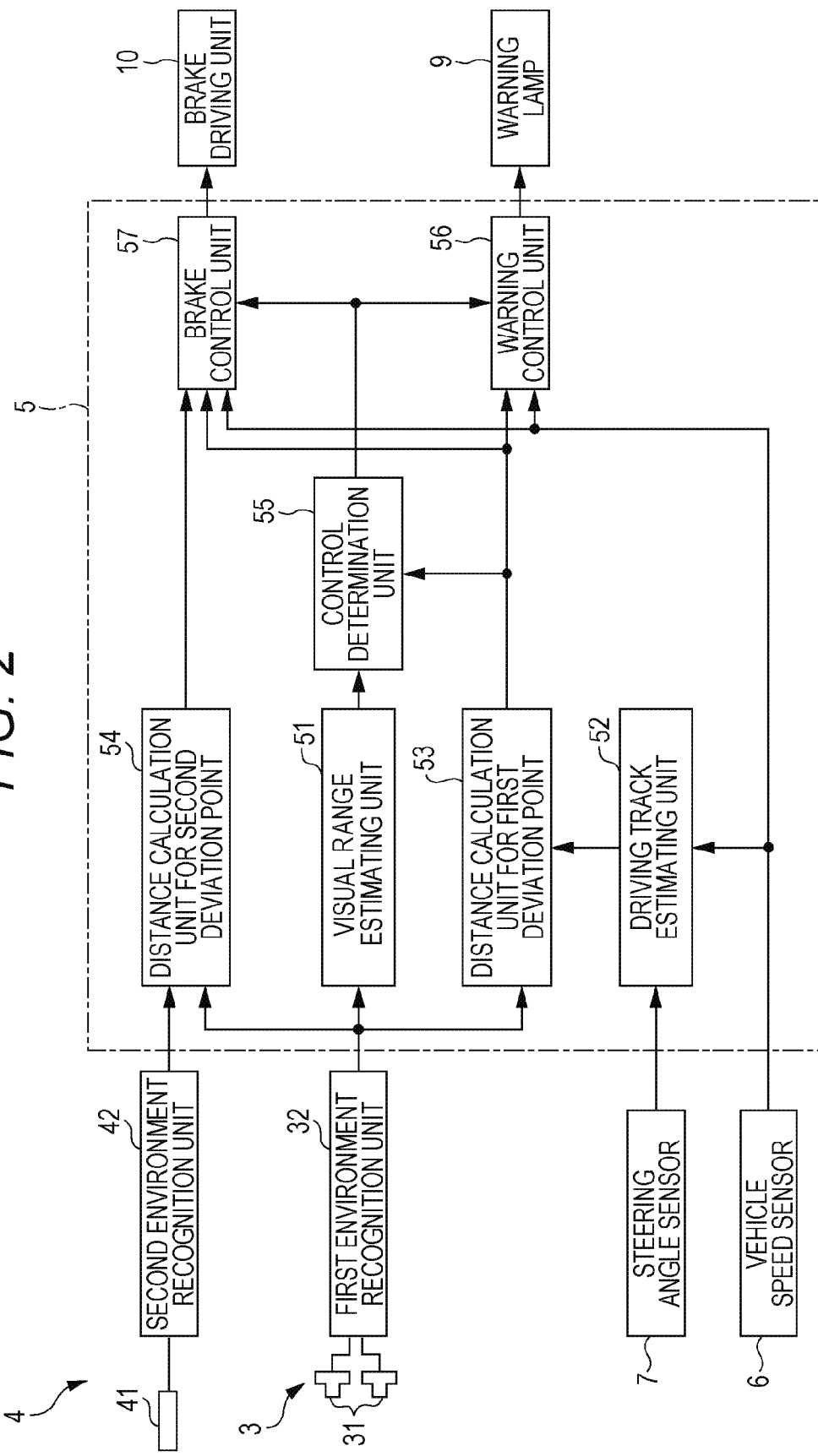
FIG. 2 is a functional block diagram illustrating a control unit according to an example of the present invention.

As illustrated in FIG. 2, the control unit 5 mainly includes a visual range estimating unit 51, a driving track estimating unit 52, a distance calculation unit 53 for a first deviation point, a distance calculation unit 54 for a second deviation point, a control determination unit 55, a warning control unit 56, and a brake control unit 57.

The visual range estimating unit 51 receives the lane line information on the driving lane from the first environment recognition unit 32, then estimates the driver's visual range Lv and outputs the driver's visual range Lv to the control determination unit 55. The driver's visual range Lv is estimated, for example, as follows: a human visual average contrast value for recognizing the lane line on the road surface is set in advance as a threshold through experiment. The visual range estimating unit 51 compares the threshold and the lane line information on the driving lane received from the first environment recognition unit 32 (distance information in front of the lane line), and the farthest distance of the lane line detected with a contrast value higher than this threshold is estimated as the driver's visual range Lv. Thus, the visual range estimating unit 51 serves as the visual range estimator of the present invention.

Figure 4:
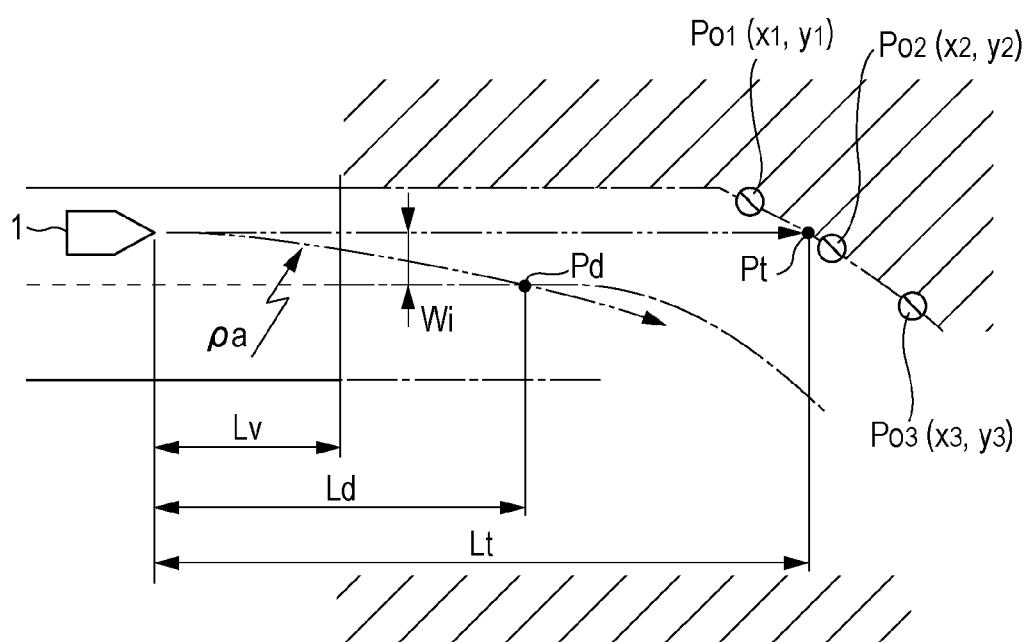
FIG. 4 is a view describing lane deviation prevention control according to the example of the present invention.

The driving track estimating unit 52 receives the vehicle speed V0 from the vehicle speed sensor 6, and receives the steering angle θH from the steering angle sensor 7. Then, for example, as illustrated in FIG. 4, the driving track of the vehicle 1 is estimated on the basis of the vehicle speed V0 and the steering angle θH, by approximation using the driving path of a turning radius ρa according to the following expression (1), for example.

$$\rho a = (1 + A \cdot V0^2) \cdot l \cdot n / \theta He \quad (1)$$

where, A denotes steering characteristics, l denotes a wheel base, n denotes a steering gear ratio, and θHe denotes a predicted steering angle value. The predicted steering angle value θHe is calculated, for example, by the following expression (2).

$$\theta He = \theta H + (d\theta H/dt) \cdot \Delta t \quad (2)$$

where, (dθH/dt) denotes a steering angle speed, and Δt denotes a predicted time.

The driving track of the vehicle 1 estimated by the driving track estimating unit 52 is output, as the turning radius ρa, to the distance calculation unit 53 for the first deviation point. Thus, the driving track estimating unit 52 is provided as the driving track estimator of the present invention.

The distance calculation unit 53 for the first deviation point receives the lane line information on the driving lane from the first environment recognition unit 32, and receives the turning radius ρa of the driving track of the vehicle 1 from the driving track estimating unit 52. Then, based on the width direction distance W1 to the approaching direction lane of the vehicle 1 and the turning radius ρa of the driving track, the distance from the driving lane of the vehicle 1 to the deviating position (indicated by point Pd in FIG. 4) is calculated as a distance Ld to the first deviation point according to the following expression (3), for example:

$$Ld = \rho a \cdot \cos(\sin^{-1}((\rho a - W1)/\rho a)) \quad (3)$$

Thus, the distance calculation unit 53 for the first deviation point is provided as the driving lane estimator and the deviation position estimator of the present invention. The distance Ld to the first deviation point thus calculated is output to the control determination unit 55, the warning control unit 56, and the brake control unit 57.

The distance calculation unit 54 for the second deviation point receives the lane line information on the driving lane from the first environment recognition unit 32, and receives the three-dimensional object information on the three-dimensional object from the second environment recognition unit 42. Then, the distance to the deviation position (indicated by a point Pt in FIG. 4) where the vehicle 1 will go straight without any change, and then deviate from the driving lane after passing a three-dimensional object (for example, guard rail, curb, and the like) by a side of a road is calculated as a distance Lt to the second deviation point. In this case, assuming, as illustrated in FIG. 4, that the deviation position Pt is located between an obstacle P01 (x1, y1) by a side of a road at the upper side of the figure and an obstacle P02 (x2, y2) by a side of a road at the lower side of the figure, the distance Lt to the second deviation point, which is a straight line connecting therebetween, is calculated according to, for example, the following expression (4):

$$Lt = x1 + (y1/(y2-y1)) \cdot (x2-x1) \quad (4)$$

Thus, the distance calculation unit 54 for the second deviation point is provided as the driving lane estimator and the deviation position estimator of the present invention. The distance Lt to the second deviation point thus calculated is output to the brake control unit 57.

The control determination unit 55 receives the visual range Lv of the driver from the visual range estimating unit 51, and receives the distance Ld to the first deviation point from the distance calculation unit 53 for the first deviation point. Then, the visual range Lv of the driver and the distance Ld of the first deviation point are compared. If the distance Ld of the first deviation point is equal to or less than the visual range Lv of the driver (Ld≤Lv), the deviation position where the vehicle 1 will deviate from the driving lane (the point Pd in FIG. 4) is determined to be recognized by the driver. Then the determination result, which indicates that the lane deviation prevention control will be not executed, is output to the warning control unit 56 and the brake control unit 57. If notification and automatic braking are executed even for the lane deviation that is recognized by the driver, the driver becomes accustomed to such notification and automatic braking, and this may cause delay of reaction when the danger is really eminent, or the driver may be annoyed by the notification and automatic braking, and turn off the driving support function itself, thereby the driving support control apparatus 2 may be unable to accomplish its function. Therefore, in such case, the activation of the warning and automatic braking are suppressed.

The warning control unit 56 receives the vehicle speed V0 from the vehicle speed sensor 6, receives the distance Ld of the first deviation point from the distance calculation unit 53 for the first deviation point, and receives the execution determination result of the control from the control determination unit 55. If the execution of the control is permitted, for example, notification is given as follows. When the following expression (5) is satisfied, a warning lamp 9 is turned on, whereby the possibility of lane deviation is notified to the driver.

$$Ld < La1 \quad (5)$$

where, $La1 = V0^2/(2 \cdot a1)$ and a1 is a deceleration set in advance through experiment, calculation, and the like.

The brake control unit 57 receives the vehicle speed V0 from the vehicle speed sensor 6, receives the distance Ld of the first deviation point from the distance calculation unit 53 for the first deviation point, receives the distance Lt of the second deviation point from the distance calculation unit 54 for the second deviation point, and receives the execution determination result of the control from the control determination unit 55. If the execution of the control is permitted, and, for example, at least either one of the following expressions (6) and (7) are satisfied, the brake driving unit 10 is activated to execute automatic braking.

$$Ld < Lb1 \quad (6)$$

$$Lt < Lb2 \quad (7)$$

where, $Lb1 = V0^2/(2 \cdot a2)$ and a2 is a deceleration set in advance through experiment, calculation, and the like, while $La1 > Lb1$. $Lb2 = V0^2/(2 \cdot a3)$ and a3 is a deceleration set in advance through experiment, calculation, and the like, while $Lb1 < Lb2$.

Thus, the warning control unit 56 and the brake control unit 57 are provided as the lane deviation prevention controller of the present invention.

Figure 3:
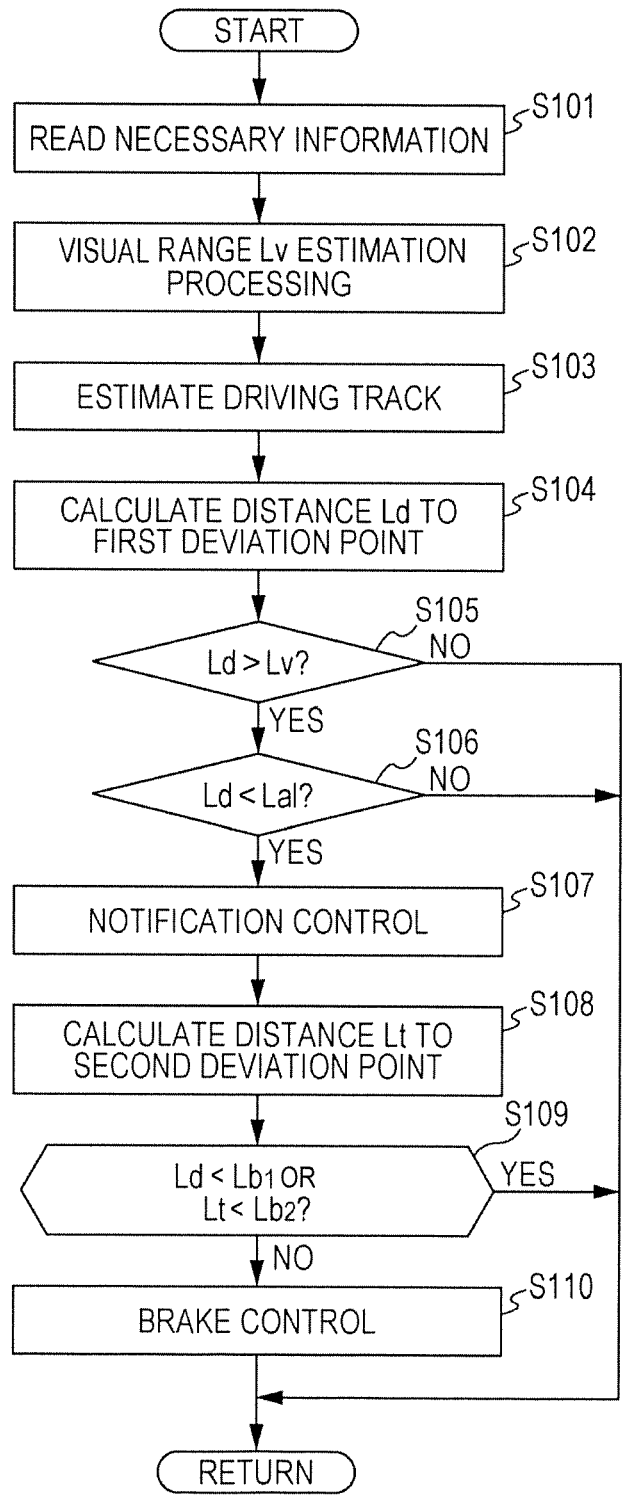
FIG. 3 is a flowchart illustrating a vehicle driving support control program according to the example of the present invention.

The vehicle driving support control executed by the control unit 5 configured as described above will be described with reference to the flowchart of FIG. 3.

In step (hereinafter abbreviated as "S") 101, necessary information is read. The necessary information includes the lane line information on the driving lane, the three-dimensional object information on the target three-dimensional object, the vehicle speed V0, and the steering angle θH.

Then the program proceeds to S102, where the driver's visual range Lv is estimated for example, as follows: a human visual average contrast value for recognizing the lane line on the road surface is set in advance as a threshold through experiment. The visual range estimating unit 51 compares the threshold and the lane line information on the driving lane received from the first environment recognition unit 32 (distance information in front of the lane line), and the farthest distance of the lane line detected with a contrast value higher than this threshold is estimated as the driver's visual range Lv.

Then the program proceeds to S103, where the driving track estimating unit 52 estimates the driving track of the vehicle 1 by approximation using the driving path of a turning radius ρa according to, for example, the expression (1) described above.

Then the program proceeds to S104, where the distance calculation unit 53 for the first deviation point calculates, as the distance Ld of the first deviation point, the distance to the deviation point where the vehicle 1 will deviate from the driving lane (indicated by the point Pd in FIG. 4) according to, for example, the above expression (3).

Then the program proceeds to S105, where the control determination unit 55 compares the visual range Lv of the driver and the distance Ld of the first deviation point to determine whether the distance Ld of the first deviation point is beyond the visual range Lv of the driver (Ld>Lv). If the distance Ld of the first deviation point is farther from the visual range Lv of the driver (Ld>Lv), the program proceeds to S106. If, on the other hand, the distance Ld of the first deviation point is equal to or less than the visual range Lv of the driver (Ld≤Lv), the deviation position where the subject vehicle 1 will deviate from the driving lane (the point Pd in FIG. 4) is determined to be recognized by the driver, and the program is exited.

When Ld>Lv as a result of determination in S105 and the program proceeds to S106, the warning control unit 56 determines whether or not the above expression (5) is satisfied. If the above expression (5) is satisfied, the program proceeds to S107 to perform the notification control of, and the warning lamp 9 is turned on to notify the driver that the vehicle will deviate from the lane. If the expression (5) is not satisfied, it is not necessary to notify the driver, and therefore, the program is exited without any further processing.

When the notification control is performed in S107, and the program proceeds to S108, where the distance calculation unit 54 for the second deviation point calculates as the distance Lt to the second deviation point, the distance to the deviation position (indicated by the point Pt in FIG. 4) where the subject vehicle 1 keeps going straight and will deviate from the driving lane after passing a three-dimensional object (for example, guard rail, curb) by a side of a road, according to, for example, the expression (4) explained above.

Then the program proceeds to S109, where, for example, the brake control unit 57 determines whether or not at least either one of the above expressions (6) and (7) is satisfied. If this determination is satisfied, the program proceeds to S110, where the brake control is executed, and the brake driving unit 10 is activated to execute the automatic brake. Then the program is exited. If this determination is not satisfied, i.e., Ld≥Lb1 and Lt≥Lb2, the program is exited without any further processing.

As described above, according to the drive support control of the example, the visual range of the driver is estimated based on the lane line information, the driving lane is estimated on the basis of at least either one of the lane line information and the three-dimensional object information, the driving track of the vehicle 1 is estimated, the deviation position where the vehicle 1 will deviate from the driving lane is estimated on the basis of the driving lane and the driving track estimated. If the driving deviation is beyond the visual range, at least either one of notification to the driver or attachment of automatic braking is executed in accordance with the possibility of deviation from the driving lane. If notification and automatic braking are executed even for lane deviation that is recognized by the driver, the driver becomes accustomed to such notification and automatic braking, and this may cause delay of reaction when the danger is really emi-nent, or the driver may be annoyed by the notification and automatic braking, and turn off the driving support function itself, whereby the original function of the driving support control apparatus 2 may be unable to accomplish its function. Therefore, in such case, the activation of the warning and automatic braking is suppressed. By such control, the vehicle is prevented from colliding with an obstacle by a side of a road and from deviating from a driving lane by giving notification to a driver, activating brake, and the like, with regard to a driving lane in front of the vehicle which is considered not to be recognized by the driver.

In the example of the present invention, the detection of the lane line and setting of the visual range are performed on the basis of image information given by the stereo camera unit 3. Alternatively, the detection of the lane line and setting of the visual range may be performed on the basis of image information given by a monocular camera unit or a color camera unit. In this example, the second environment recognition unit is configured to detect three-dimensional object information using radio wave information given by the millimeter wave radar. Alternatively, three-dimensional object information may be detected using optical wave information given by a laser radar.

The invention claimed is:

1. A driving support control apparatus for a vehicle, comprising:
    a first environment recognizer to obtain lane line information on a lane line defining a driving lane in which the vehicle travels, on the basis of an image in front of the vehicle;
    a second environment recognizer to obtain information on a three-dimensional object along the driving lane, on the basis of a radio wave transmitted and received from an area in front of the vehicle;
    a visual range estimator to estimate a visual range of a driver on the basis of the lane line information, the visual range indicating a farthest distance of a recognized lane line in front of the vehicle;
    a driving lane estimator to estimate the driving lane on the basis of at least either one of the lane line information and the three-dimensional object information;
    a driving track estimator to estimate the driving track of the vehicle;
    a deviation position estimator to estimate a deviation position where the vehicle will deviate from the driving lane, on the basis of the driving lane estimated by the driving lane estimator and the driving track estimated by the driving track estimator; and
    a lane deviation prevention controller to execute at least either one of notification to the driver and automatic braking in accordance with a possibility of deviation from the driving lane when the deviation position is beyond the visual range.

2. The vehicle driving support control apparatus according to claim 1, wherein the visual range estimator previously sets, as a first threshold, a human visual average contrast value for recognizing the lane line, and estimates, as the visual range of the driver, a distance to a lane line detected with a contrast value higher than the first threshold.

3. The vehicle driving support control apparatus according claim 2, wherein the lane deviation prevention controller notifies the possibility of lane deviation to the driver when the deviation position is beyond the visual range and the deviation position is closer than a second threshold.

4. The vehicle driving support control apparatus according to claim 3, wherein the lane deviation prevention controller executes the automatic brake when the deviation position is beyond the visual range and a distance to a position where the vehicle collides with the three-dimensional object by the side of the road is closer than a third threshold.

5. The vehicle driving support control apparatus according to claim 2, wherein the lane deviation prevention controller executes the automatic brake when the deviation position is beyond the visual range and a distance to a position where the vehicle collides with the three-dimensional object by the side of the road is closer than a second threshold.

6. The vehicle driving support control apparatus according claim 1, wherein the lane deviation prevention controller notifies the possibility of lane deviation to the driver when the deviation position is beyond the visual range and the deviation position is closer than a first threshold.

7. The vehicle driving support control apparatus according to claim 6, wherein the lane deviation prevention controller executes the automatic brake when the deviation position is beyond the visual range and a distance to a position where the vehicle collides with the three-dimensional object by the side of the road is closer than a second threshold.

8. The vehicle driving support control apparatus according to claim 1, wherein the lane deviation prevention controller executes the automatic brake when the deviation position is beyond the visual range and a distance to a position where the vehicle collides with the three-dimensional object by the side of the road is closer than a second threshold.

9. A vehicle driving support control apparatus comprising:
 a first environment recognizer to detect lane line information on a driving lane in front, on the basis of image information;
 a second environment recognizer to detect information on a three-dimensional object by a side of a road of the driving lane in front, on the basis of radio wave information transmitted and received;
 a visual range estimator to estimate a visual range of a driver on the basis of the lane line information;
 a driving lane estimator to estimate the driving lane on the basis of at least either one of the lane line information and the three-dimensional object information;
 a driving track estimator to estimate the driving track of the vehicle;
 a deviation position estimator to estimate a deviation position where the vehicle will deviate from the driving lane, on the basis of the driving lane estimated by the driving lane estimator and the driving track estimated by the driving track estimator; and
 a lane deviation prevention controller to execute at least either one of notification to the driver and automatic braking in accordance with a possibility of deviation from the driving lane when the deviation position is beyond the visual range, wherein
 the visual range estimator previously sets, as a first threshold, a human visual average contrast value for recognizing the lane line, and estimates, as the visual range of the driver, a distance to a lane line detected with a contrast value higher than the first threshold.

10. The vehicle driving support control apparatus according claim 9, wherein the lane deviation prevention controller notifies the possibility of lane deviation to the driver when the deviation position is beyond the visual range and the deviation position is closer than a second threshold.

11. The vehicle driving support control apparatus according to claim 10, wherein the lane deviation prevention controller executes the automatic brake when the deviation position is beyond the visual range and a distance to a position where the vehicle collides with the three-dimensional object by the side of the road is closer than a third threshold.

12. The vehicle driving support control apparatus according to claim 9, wherein the lane deviation prevention controller executes the automatic brake when the deviation position is beyond the visual range and a distance to a position where the vehicle collides with the three-dimensional object by the side of the road is closer than a second threshold.

* * * * *